US008923771B2

(12) United States Patent
Zeng et al.

(10) Patent No.: US 8,923,771 B2
(45) Date of Patent: Dec. 30, 2014

(54) METHOD, APPARATUS AND COMPUTER PROGRAM PRODUCT FOR IDENTIFYING FREQUENCY BANDS, AND A METHOD, APPARATUS AND COMPUTER PROGRAM PRODUCT FOR EVALUATING PERFORMANCE

(75) Inventors: Yong Hong Zeng, Singapore (SG); Ying Chang Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/819,414

(22) PCT Filed: Aug. 23, 2011

(86) PCT No.: PCT/SG2011/000287
§ 371 (c)(1),
(2), (4) Date: May 15, 2013

(87) PCT Pub. No.: WO2012/030301
PCT Pub. Date: Mar. 8, 2012

(65) Prior Publication Data
US 2013/0225105 A1    Aug. 29, 2013

(30) Foreign Application Priority Data
Aug. 30, 2010  (SG) .............................. 201006311-3

(51) Int. Cl.
H04B 15/00    (2006.01)
H04L 27/00    (2006.01)
H04B 17/00    (2006.01)
H04W 72/00    (2009.01)
H04W 28/04    (2009.01)
H04W 24/00    (2009.01)

(52) U.S. Cl.
CPC ............ *H04B 17/00* (2013.01); *H04B 17/0055* (2013.01); *H04W 72/00* (2013.01); *H04W 28/04* (2013.01); *H04B 17/0077* (2013.01); *H04W 24/00* (2013.01); *H04L 27/0006* (2013.01); *H04B 17/0045* (2013.01)
USPC ......................................... 455/62; 455/226.1

(58) Field of Classification Search
USPC ................................................ 455/62, 226.1
See application file for complete search history.

(56) References Cited

U.S. PATENT DOCUMENTS

2006/0177869 A1 *  8/2006  Heal et al. ...................... 435/7.1

OTHER PUBLICATIONS

Zhi Tian et al, A Wavelet Approach to Wideband Spectrum Sensing for Cognitive Radios, IEEE, PI, Jun. 1, 2006, pp. 1-5.*

(Continued)

*Primary Examiner* — Lee Nguyen
(74) *Attorney, Agent, or Firm* — K. David Crockett, Esq.; Niky Economy Syrengelas, Esq.; Crockett & Crockett, PC

(57) ABSTRACT

According to embodiments of the present invention, a method for identifying one or more frequency bands in a received signal. The method comprising: calculating a wavelet product of the received signal; setting a threshold for local maxima of the wavelet product; and detecting one or more edges in the received signal based on local maxima of the wavelet product which are greater than the threshold to identify one or more frequency bands in the received signal. A corresponding apparatus and computer program product are also provided. Embodiments also relate to a method for evaluating performance of a method for identifying one or more frequency bands in a received signal. A corresponding apparatus and computer program product are also provided.

16 Claims, 15 Drawing Sheets

(56) References Cited

OTHER PUBLICATIONS

Zhi., et al, A Wavelet Approach to Wideband Spectrum Sensing for Cognitive Radios, Cognitive Radio Oriented Wireless Networks and Communications 1 (2006).
Hur., et al, A Wideband Analog Multi-Resolution Spectrum Sensing (MRSS) Technique for Cognitive Radio (CR) Systems, IEEE International Symposium on Circuits and Systems 4090 (IEEE 2006).
De Almeida., et al, Experimental Study of a Wavelet-Based Spectrum Sensing Technique, Signals, Systems and Computers 1552 (2008).
Ariananda., et al, A Survey on Spectrum Sensing Techniques for Cognitive Radio, Cognitive Radio and Advanced Spectrum Management 74 (2009).
Lakshmanan., et al, Cognitive Radio Transmission and Spectrum Sensing Using a Wavelet Packet Transceiver, IEEE 20th International Symposium on Personal, Indoor and Mobile Radio Communications 142 (IEEE 2009).
Tian., et al, Performance Evaluation of Distributed Compressed Wideband Sensing for Cognitive Radio Networks, 11th International Conference 1 (2008).
Bazerque., et al, Distributed Spectrum Sensing for Cognitive Radio Networks by Exploiting Sparsity, 58 IEEE Transactions on Signal Processing 1847 (IEEE 2010).
Tugnait, Wideband Spectrum Sensing for Cognitive Radios in Unknown Noise via Power Spectrum Analysis, 44th Asilomar Conference on Signals, Systems and Computers 175 (2010).
Mitola., et al, Cognitive Radio: Making Software Radios More Personal, 6 IEEE Personal Communications, 13 (1999).
Haykin, Cognitive Radio: Brain-Empowered Wireless Communications, 23 IEEE Journal on Selected Areas in Communications 201 (IEEE 2005).
Devroye., et al, Achievable Rates in Cognitive Radio Channels, 52 IEEE Trans on Information Theory 1813 (IEEE 2006).
Stevenson., et al, IEEE 802.22: The First Cognitive Radio Wireless Regional Area Network Standard, 47 IEEE Communications Magazine 130 (IEEE 2009).
About WIA, Wireless Innovation Alliance, (Jun. 26, 2014), http://www.wirelessinnovationalliance.com.
Candès., et al, Robust Uncertainty Principles: Exact Signal Reconstruction from Highly Incomplete Frequency Information, 52 IEEE Transactions on Information Theory 489 (IEEE 2006).
Candès., et al, An Introduction to Compressive Sampling, 21 IEEE Signal Processing Magazine (IEEE 2008).
Donoho, Compressed Sensing, 52 IEEE Transactions on Information Theory 1289 (IEEE 2006).
Polo., et al, Compresive Wide-Band Spectrum Sensing, IEEE ICASSP 2337 (IEEE 2009).
Quan., et al, Collaborative Wideband Sensing for Cognitive Radios, 25 IEEE Signal Processing Magazine 60 (IEEE 2008).
Quan., et al, Optimal Multiband Joint Detection for Spectrum Sensing in Cognitive Radio Networks, 57 IEEE Transaction on Signal Processing 1128 (IEEE 2009).
Taherpour., et al, Invariant Wideband Spectrum Sensing Under Unknown Variances, 8 IEEE Transaction on Wireless Communications 2182 (IEEE 2009).
Demessie, et al., Sensing Techniques for Cognitive Radio-State of the Art and Trends, IEEE SCC41-P1900.6 White Paper (IEEE 2009).
Mallat., et al, Singularity Detection & Processing with Wavelets, 38 IEEE Transactions on Information Theory 617 (IEEE 1992).
Sadler., et al, Analysis of Multiscale Products for Step Detection and Estimation, 45 IEEE Transactions on Information Theory 1043 (IEEE 1999).
Sonnenschein., et al, Radiometric Detection of Spread-Spectrum Signals in Noise of Uncertainty Power, 28 IEEE Transactions on Aerospace and Electronic Systems 654 (IEEE 1992).
Tandra., et al, Fundamental Limits on Detection in Low SNR Under Noise Uncertainty, International Conference on Wireless Networks, Communications and Mobile Computing 464 (2005).
Shellhammer., et al, Performance of the Power Detector with Noise Uncertainty, doc. IEEE 802.22-06/0134r0 (2006).
Sahai., et al, Spectrum Sensing: Fundamental Limits and Practical Challenges, IEEE International Symposium on New Frontiers in Dynamic Spectrum Access Networks (DySPAN) (IEEE 2005).
Rabideau., et al, Mitigation of Digital Array Nonlinearities, IEEE Radar Conference 175 (IEEE 2001).

\* cited by examiner

METHOD, APPARATUS AND COMPUTER PROGRAM PRODUCT FOR IDENTIFYING FREQUENCY BANDS, AND A METHOD, APPARATUS AND COMPUTER PROGRAM PRODUCT FOR EVALUATING PERFORMANCE

CROSS-REFERENCE TO RELATED APPLICATION

This application claims the benefit of priority of Singapore application No. 201006311-3, filed 30 Aug. 2010, the content of it being hereby incorporated by reference in its entirety for all purposes.

TECHNICAL FIELD

Various embodiments relate to a method, apparatus and computer program product for identifying one or more frequency bands in a received signal, and, a method, apparatus and computer program product for evaluating performance of a method for identifying one or more frequency bands in a received signal.

BACKGROUND

Cognitive radio allows different networks or users to dynamically share the frequency spectrum to achieve maximum utility without causing harmful interference to each other. To do so, a cognitive radio needs to frequently perform spectrum sensing, i.e. detecting the presence of primary users or other secondary users, such as, for example, other cognitive radios. Based on the detected spectrum information, a cognitive radio takes action to maximize its own cost function and at the same time protect the interests of primary users and other secondary users.

A cognitive radio does not have fixed spectra; therefore, it may need to sense a very large frequency range to find available spectrum. The sensed aggregate spectral bandwidth could be as large as several GHz. Furthermore, a cognitive radio may not have enough information of the band policy of primary users and other secondary users. Band policy may relate to rules on spectrum usage that users must obey. For example, the allocated center frequency and bandwidth for a television broadcaster are usually within a predefined set (called bands or channels). Therefore, when television signals are sensed in a large frequency range, sensing can be performed band-by-band, which is called multiband sensing.

However, in some other situations, the sensed primary and secondary users may not have such a policy or the policy may not be known. In other words, the sensed signal can be at any center frequency and occupy any bandwidth within the large frequency range. Lack of information of the center frequency and bandwidth of the sensed signal means that 'band-by-band' or 'channel-by-channel' sensing is not valid. Moreover, the center frequency and bandwidth of the sensed signal needs to be detected. This is called wideband sensing, which is more general than conventional multiband sensing wherein the center frequency and bandwidth of each band are known. Hence multiband sensing is just a special case of wideband sensing.

SUMMARY

Various embodiments provide a method for identifying one or more frequency bands in a received signal, the method comprising: calculating a wavelet product of the received signal; setting a threshold for local maxima of the wavelet product; and detecting one or more edges in the received signal based on local maxima of the wavelet product which are greater than the threshold to identify one or more frequency bands in the received signal.

Various embodiments provide an apparatus comprising: at least one processor; and at least one memory including computer program code; the at least one memory and the computer program code being configured, with the at least one processor, to cause the apparatus to perform at least the following: calculate a wavelet product of the received signal; set a threshold for local maxima of the wavelet product; and detect one or more edges in the received signal based on local maxima of the wavelet product which are greater than the threshold to identify one or more frequency bands in the received signal.

Various embodiment provide a computer program product comprising at least one computer-readable storage medium having computer-executable program code instructions stored therein, the computer-executable program code instructions comprising: program code for calculating a wavelet product of the received signal; program code for setting a threshold for local maxima of the wavelet product; and program code for detecting one or more edges in the received signal based on local maxima of the wavelet product which are greater than the threshold to identify one or more frequency bands in the received signal.

Various embodiments provide a method for evaluating performance of a method for identifying one or more frequency bands in a received signal, said method for evaluating performance comprising evaluating performance based on at least one of the following metrics: a subcarrier occupancy error rate for a subcarrier of the received signal; a wideband spectrum error for a subcarrier of the received signal; and a band occupancy error for a frequency band of the received signal.

Various embodiments provide an apparatus comprising: at least one processor; and at least one memory including computer program code; the at least one memory and the computer program code being configured, with the at least one processor, to cause the apparatus to perform at least the following: evaluate performance based on at least one of the following metrics: a subcarrier occupancy error rate for a subcarrier of the received signal; a wideband spectrum error for a subcarrier of the received signal; and a band occupancy error for a frequency band of the received signal.

Various embodiments provide a computer program product comprising at least one computer-readable storage medium having computer-executable program code instructions stored therein, the computer-executable program code instructions comprising: program code for evaluating performance based on at least one of the following metrics: a subcarrier occupancy error rate for a subcarrier of the received signal; a wideband spectrum error for a subcarrier of the received signal; and a band occupancy error for a frequency band of the received signal.

BRIEF DESCRIPTION OF THE DRAWINGS

In the drawings, like reference characters generally refer to like parts throughout the different views. The drawings are not necessarily to scale, emphasis instead generally being placed upon illustrating the principles of some example embodiments of the invention. In the following description, various example embodiments of the invention are described with reference to the following drawings, in which.

DETAILED DESCRIPTION

Figure 1:
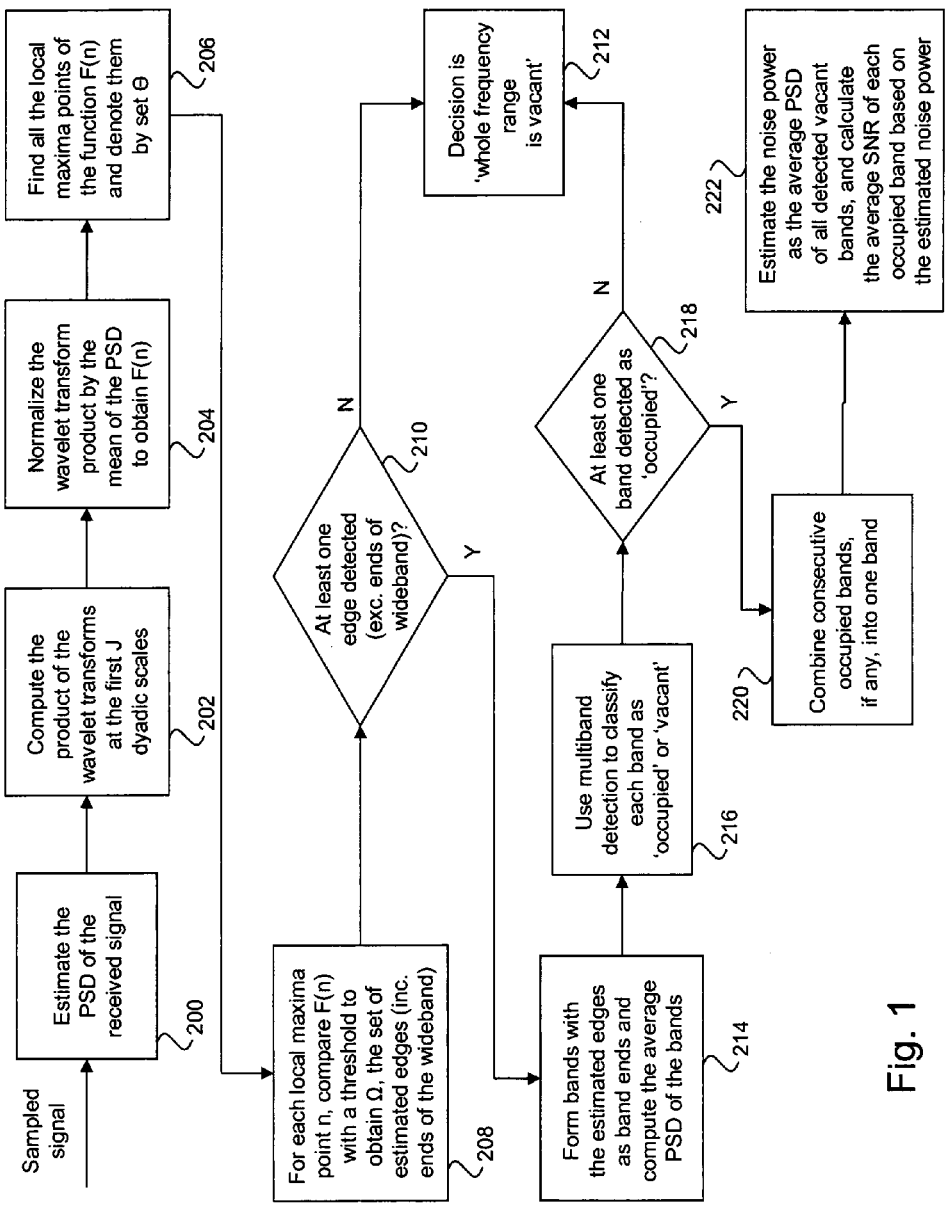
FIG. 1 is a flow diagram of a method for edge based wideband sensing according to an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Various embodiments provide a method for identifying one or more frequency bands in a received signal, the method comprising: calculating a wavelet product of the received signal; setting a threshold for local maxima of the wavelet product; and detecting one or more edges in the received signal based on local maxima of the wavelet product which are greater than the threshold to identify one or more frequency bands in the received signal.

In an embodiment, the wavelet product is:

$$F(n) = \prod_{j=1}^{J} W_{2^j} P(n).$$

where $W_{2^j}$ is the continuous wavelet transform having a scale of $2^j$ and $P(n)$ is the power spectral density at subcarrier n of the received signal.

In an embodiment, the method further comprises normalizing the wavelet product.

In an embodiment, the wavelet product is normalized by a mean power spectral density of the received signal.

In an embodiment, the normalized wavelet product is:

$$F_N(n) = |F(n)|/\Delta^J.$$

where $\Delta$ is the mean power spectral density of the received signal.

In an embodiment, a fixed threshold is set for a given fast Fourier transform size and sample size of the received signal.

In an embodiment, the method further comprises calculating a mean power spectral density for an identified frequency band.

In an embodiment, the mean power spectral density of a band $[l_k, l_{k+1}]$ is calculated as follows:

$$\Delta(k) = \frac{1}{l_{k+1} - l_k + 1} \sum_{n=l_k}^{l_{k+1}} P(n).$$

where $P(n)$ is the power spectral density at subcarrier n of the received signal.

In an embodiment, the method further comprises detecting if the identified frequency band is being used based on a ratio of a mean power spectral density of the identified frequency band to a minimum power spectral density and a predetermined threshold.

In an embodiment, the identified frequency band is detected as being used based on comparing the mean power spectral density of the identified band divided by the minimum power spectral density with the predetermined threshold.

In an embodiment, if no frequency bands are detected as used the whole frequency range of the received signal is identified as vacant.

In an embodiment, the minimum power spectral density corresponds to the mean power spectral density of one or more identified frequency bands having the lowest power spectral density among the identified frequency bands.

In an embodiment, the minimum power spectral density comprises an average of the mean power spectral density of two or more identified frequency bands having the lowest mean power spectral density among the identified frequency bands.

In an embodiment, the minimum power spectrum is:

$$\sigma_n^2 = \frac{1}{K_s} \sum_{n=1}^{K_s} \hat{\Delta}(K - n).$$

where $K_s$ is the number of identified frequency bands having the lowest mean power spectral density among the identified frequency bands, K is the number of detected edges and $\hat{\Delta}(k)$ is the mean power spectral density sequence in descending order.

In an embodiment, the method further comprises combining consecutive frequency bands detected as being used.

In an embodiment, the method further comprises calculating an estimated noise power as the mean power spectral density of all identified frequency bands detected as not being used, and calculating a mean signal to noise ratio for each identified frequency band detected as being used based on the estimated noise power.

In an embodiment, further comprises sensing a frequency range of the received signal, wherein the frequency range bounds a portion of the frequency spectrum within which one or more frequency bands are to be identified.

In an embodiment, the method further comprises receiving the received signal.

Various embodiments provide an apparatus comprising: at least one processor; and at least one memory including computer program code; the at least one memory and the computer program code being configured, with the at least one processor, to cause the apparatus to perform at least the following: calculate a wavelet product of the received signal; set a threshold for local maxima of the wavelet product; and detect one or more edges in the received signal based on local maxima of the wavelet product which are greater than the threshold to identify one or more frequency bands in the received signal.

Various embodiments provide a computer program product comprising at least one computer-readable storage medium having computer-executable program code instructions stored therein, the computer-executable program code instructions comprising: program code for calculating a wavelet product of the received signal; program code for setting a threshold for local maxima of the wavelet product; and program code for detecting one or more edges in the received signal based on local maxima of the wavelet product which are greater than the threshold to identify one or more frequency bands in the received signal.

The further features described above with reference to the above-described method for identifying one or more frequency bands in a received signal are equally applicable to the apparatus and the computer program product just described.

Various embodiments provide a method for evaluating performance of a method for identifying one or more frequency bands in a received signal, said method for evaluating performance comprising evaluating performance based on at least one of the following metrics: a subcarrier occupancy error rate for a subcarrier of the received signal; a wideband spectrum error for a subcarrier of the received signal; and a band occupancy error for a frequency band of the received signal.

In an embodiment, the subcarrier occupancy error rate is defined as:

$$SOER = \frac{\sum_{n=0}^{N-1} |SOI_a(n) - SOI_d(n)|}{N},$$

where $SOI_a(n)$ and $SOI_d(n)$ are the actual and detected subcarrier occupancy index for subcarrier n of the received signal, respectively, and N is the number of frequency points in the received signal.

In an embodiment, the wideband spectrum error is defined as:

$$WSE = \frac{\sum_{n=0}^{N-1} |SOD_a(n) - SOD_d(n)|^2}{\sum_{n=0}^{N-1} |SOD_a(n)|^2},$$

where $SOD_a(n)$ and $SOD_d(n)$ are the actual and detected subcarrier occupancy degree for subcarrier n of the received signal, respectively, and N is the number of frequency points in the received signal.

In an embodiment, the band occupancy error is defined as:

$$BOE = \frac{\sum_{n=0}^{N-1} |BOD_a(b_a(n)) - BOD_d(b_d(n))|^2}{\sum_{n=0}^{N-1} |BOD_a(b_a(n))|^2},$$

where $BOD_a(k)$ and $BOD_d(k)$ are the actual and detected band occupancy degree for band k of the received signal, respectively.

In an embodiment, the method further comprises evaluating performance based on at least one of the following additional metrics: a probability of detecting any occupied frequency band in the received signal; and a probability of falsely reporting any occupied frequency band in the received signal Various embodiments provide an apparatus comprising: at least one processor; and at least one memory including computer program code; the at least one memory and the computer program code being configured, with the at least one processor, to cause the apparatus to perform at least the following: evaluate performance based on at least one of the following metrics: a subcarrier occupancy error rate for a subcarrier of the received signal; a wideband spectrum error for a subcarrier of the received signal; and a band occupancy error for a frequency band of the received signal.

Various embodiments provide a computer program product comprising at least one computer-readable storage medium having computer-executable program code instructions stored therein, the computer-executable program code instructions comprising: program code for evaluating performance based on at least one of the following metrics: a subcarrier occupancy error rate for a subcarrier of the received signal; a wideband spectrum error for a subcarrier of the received signal; and a band occupancy error for a frequency band of the received signal.

The further features described above with reference to the above-described method for evaluating performance are equally applicable to the apparatus and the computer program product just described.

It is noted that the term 'wideband sensing' is used to mean analyzing a received signal to identify one or more frequency bands wherein a band policy relating to the received signal is not known. For example, an information signal (i.e. a signal portion which conveys some transmitted data) within the received signal can be at any center frequency and occupy any bandwidth within the large frequency range of the received signal.

The following describes an exemplary method for identifying one or more frequency bands in a received signal. In an embodiment, the method is performed by an apparatus, such as, for example, a cognitive radio or other communication device. It is to be understood that in some embodiments the received signal may be received directly from a signal transmission medium, such as, for example, a wire or a wireless area. However, in some other embodiments the received signal may be received indirectly from the signal transmission medium, such as, for example, via an external receiver. In any case, once the received signal has been received, it is analyzed to identify one or more frequency bands present.

System Description

In an embodiment, to find a good available frequency band, a frequency range as large as possible is sensed. It is assumed that the frequency range is sensed with a center frequency $f_c$ and a bandwidth $B_w$. In an embodiment, the bandwidth $B_w$ could be as large as several GHz. In an embodiment, within the frequency range, it is assumed that the primary user's signal or other secondary users' signals could be at any place and occupy any amount of bandwidth.

In an embodiment, let $\mathcal{H}_0$ and $\mathcal{H}_1$ represent the hypothesis of signal absent and signal present in the whole frequency range, respectively. Then the received signal (after sampling) may be given by:

$$\mathcal{H}_0: \chi(n) = \eta(n) \quad (1)$$

$$\mathcal{H}_1: \chi(n) = s(n) + \eta(n) \quad (2)$$

$n = 0, 1, \ldots, N_s - 1,$ where $N_s$ is the number of samples, $\eta(n)$ is the noise, and $s(n)$ is the received signal component (received source signal) at time n, which includes multipath and fading effects.

In an embodiment, wideband sensing has the following three objectives:

The first objective, similar to conventional single-band or multiband sensing, is to make a decision on the binary hypothesis testing (choose $\mathcal{H}_0$ or $\mathcal{H}_1$) based on the received signal. Stated differently, the first objective is to determine if the whole band is vacant or occupied. For this objective, the performance is indicated by the following two probabilities:

1. probability of detection, $P_d$, which defines, at the hypothesis $\mathcal{H}_1$, the probability of the sensing algorithm having detected the presence of the source signal; and
2. probability of false alarm, $P_{fa}$, which defines, at the hypothesis $\mathcal{H}_0$, the probability of the sensing algorithm claiming the presence of the source signal.

The second objective is to estimate the exact spectrum locations of the source signal within the frequency range, if the decision is $\mathcal{H}_1$ (i.e. the whole band is occupied). For example, the whole frequency range may be divided into a number of smaller bands. Also, each band may be classified as 'occupied' or 'vacant'. The performance metric for this objective is much more complicated and will be discussed later.

The third objective is to estimate the average SNR of each occupied band detected. This is to provide information for possible spectrum sharing with the existing users in the band. It is possible that further information on each band, such as signal features, is also required to be detected.

In an embodiment, to sense a very large frequency range, it is necessary to use a very large sampling rate, which can be very challenging in practice. Fortunately, assuming that a large part of the frequency range is vacant, that is, the signal is frequency domain sparse, it is possible to use compressed sampling (also called compressed sensing) to reduce the sampling rate by a large margin. At a highly reduced sampling rate, the received signal can be recovered with very high probability. This technique could be used herein to reduce the sampling complexity. However, it does not affect the detection methods if we assume that the received signal is fully recovered without error from the compressed samples. Hence, the following embodiment uses uncompressed samples in all cases. However, in some embodiments compressed sampling may be used.

In an embodiment, it is assumed that the received signal has been down-converted to the baseband. Hence the sensed frequency range is $[-B_w/2, B_w/2]$. In an embodiment, it is assumed that noise samples $\eta(n)$ are independent and identically distributed (i.i.d) complex Gaussian. In an embodiment, it is assumed that no information on the sensed source signals is available at the receiver, i.e. no priori information on the possible band locations and bandwidths is known. Therefore, s(n) is modeled as a random variable with unknown distribution. In an embodiment, it is assumed that signal and noise are independent.

Edge Based Wideband Sensing

In an embodiment, a signal should occupy one or multiple continuous frequency ranges. A continuous frequency range is also called a band. Theoretically, the average power spectral density (PSD) of an occupied band should be higher than the noise power, while the average PSD of a vacant band should be the noise power. Hence, at the intersection of an occupied band and a vacant band there is a sharp change. The sharp changing point is called an edge or a step. However, edge detection may be complicated for the following reasons: (1) the source signal may also have sharp changes within an occupied band; (2) since it is necessary to detect primary signals at very low SNR level to avoid a "hidden node problem", the edges contributed by noise may have significant impact; (3) the ends of an occupied band may not be sharp enough. The following embodiment aims to overcome these complications.

In an embodiment, the fast Fourier transform (FFT) is used to compute the PSD. However, in some other embodiments, other methods could be used to compute the PSD, for example, to improve performance. Let N be the size of FFT, which means that the frequency range is sampled to have N frequency points. Each frequency point is called a subcarrier. Let $X_i$, $S_i$ and $\Gamma_i$ be the normalized FFT of the received signal vector $\chi(iN:(i+1)N-1)$, the source signal vector $s(iN:(i+1)N-1)$ and noise vector $\eta(iN:(i+1)N-1)$, respectively. Note that the Matlab™ notation is used here and in the following. Let $P(n)$ (n=0, 1, N−1) be the PSD at subcarrier n and $$P = [P(0) P(1) \ldots P(N-1)]^T. \quad (3)$$

Then an estimation of the PSD is given as:

$$P = \frac{1}{M} \sum_{i=0}^{M-1} X_i \odot X_i^*, \quad (4)$$

where $M=[N_s/N]$, $\odot$ is the piecewise product and * is the conjugate. Note that the received signal $\chi(n)$ is zero padded if necessary.

In an embodiment, the multi-scale wavelet can be used for step detection. Next, the method is described. Let $\phi(t)$ be a continuous-time wavelet and $W_a f(y)$ be the continuous wavelet transform of signal f(t), where a is the scale of the wavelet. When the input signal is a discrete sequence, its wavelet transform is the approximation of the integration in the continuous wavelet transform by a discrete convolution. $W_a f(n)$ is defined as the wavelet transform of discrete sequence f(m). In an embodiment, using the dyadic scale, that is, $a=2^j$, is preferable. Also, in an embodiment, using the product of wavelet transforms at multi-scales may give better performance at low SNR. Let F(n) be the product of the wavelet transforms of P(n) at the first J dyadic scales, that is, $$F(n) = \prod_{j=1}^{J} W_{2^j} P(n). \quad (5)$$

At the step or edge, |F(n)| will have a relatively larger value. Hence, the local maximum points of |F(n)| could give the locations of edges. However, there may be a large number of local maximum points. Some of them do represent the band edges, but others may be caused by noise and sharp changes of signal within a band. Choosing the local maximum points is a challenging problem. The following explains how an embodiment overcomes this problem.

In an embodiment, to prevent keeping too many fake edges, a threshold is set for the local maxima. Only the local maximum points which are larger than the threshold are kept. The choice of the threshold is a challenging task. Note that a local maximum of |F(•)| at point n is not only related to the shape of the PSD near n but also related to the amplitude of the PSD. Therefore, the threshold should not be a fixed value. In an embodiment, the wavelet transform product is normalized first so that a fixed threshold may be chosen. In an embodiment, let $\Delta$ be the mean of the PSD, that is, $$\Delta = \frac{1}{N} \sum_{n=0}^{N-1} P(n). \quad (6)$$

In an embodiment, let $F_N(n)$ be the normalized product, that is, $$F_N(n)=|F(n)|/\Delta^J. \quad (7)$$

In an embodiment, let $\gamma_e$ be the threshold, which is fixed for a given FFT size N and sample size $N_s$. In an embodiment, only local maximum points satisfying the following condition are kept: $F_N(n) > \gamma_e$.

In an embodiment, the selected edges and the two ends of the whole frequency range are denoted by a set $\Omega$, that is, $$\Omega=\{n|n \text{ is a local maximum point } of F_N(n) \text{ and } F_N(n) \\ >\gamma_e\}\cup\{0, N-1\}. \quad (8)$$

In an embodiment, let $l_k$ (k=1, 2, ..., K) be the elements of $\Omega$ in ascending order. Thus $l_k$ (k=1, 2, ..., K) are the estimated band edges in the frequency range. The initially identified bands are therefore $[l_k, l_{k+1}]$, where k=1, 2, ..., K−1. Still some of the edges may be false band edges (caused by noise or signal spike). The next step is to further classify the bands as either occupied or vacant. This is a multi-band detection problem, though the bandwidths of the bands usually are different here.

In an embodiment, let $\Delta(k)$ be the average PSD of the band $[l_k, l_{k+1}]$, that is, $$\Delta(k) = \frac{1}{l_{k+1} - l_k + 1} \sum_{n=l_k}^{l_{k+1}} P(n). \quad (9)$$

In an embodiment, $\Delta(k)$ may be compared with the noise power to decide whether the band is occupied or vacant. However, the noise power is usually unknown and may change with time and location. Therefore, it is assumed that the noise power is unknown and so it is estimated using the wideband property. The two hypotheses for each band are:

$$\mathcal{H}_0(k): \Delta(k)=\Delta_\eta(k) \quad (10)$$

$$\mathcal{H}_1(k): \Delta(k)=\Delta_s(k)+\Delta_\eta(k), \quad (11)$$

$$k=1,2,\ldots,K-1$$

where $\Delta_s(k)$ and $\Delta_\eta(k)$ are the average PSD of the source signal and noise within band k, respectively. This is a multi-band sensing problem which will be discussed in detail in the next section.

In an embodiment, if some of the detected occupied bands are consecutive, they are combined into one band. In an embodiment, the noise power is then estimated as the average PSD of all detected vacant bands. Based on the estimated noise power, the average SNR of each occupied band can be easily estimated.

In an embodiment, edge based wideband sensing may be performed as follows. FIG. 1 illustrates the method as a flow diagram.

Algorithm 1: Edge based wide band sensing (EWS)

1) In 200, estimate the PSD of the received signal by (4).
2) In 202, compute the product of the wavelet transforms at the first J dyadic scales as shown by (5).
3) In 204, normalize the wavelet transform product by the mean of the PSD as shown in (7).
4) In 206, find all the local maximum points of the function $F_N(n)$ (i.e. the normalized wavelet transform product) and denote them by set θ.
5) In 208, for each local maximum point n, compare $F_N(n)$ with a threshold $\gamma_e$ to obtain $\Omega$, the set of indices of estimated edges and the two ends of the whole frequency range.
6) In 210, if there is at least one edge detected within the frequency range (excluding the two ends), continue the following steps;

-continued

Algorithm 1: Edge based wide band sensing (EWS)

otherwise, the decision is $H_0$: "the whole frequency range is vacant" (212).
7) In 214, form bands with the estimated edges as band ends and compute the average PSD of the bands.
8) In 216, use a multi-band detection to classify each band as occupied or vacant. A multi-band detection will be discussed in detail in the next section.
9) In 218, if there is at least one band is detected as occupied, continue the following steps; otherwise, the decision is $H_0$: "the whole frequency range is vacant".
10) In 220, combine consecutive occupied bands, if any, into one band.
11) In 222, estimate the noise power as the average PSD of all detected vacant bands, and calculate the average SNR of each occupied band based on the estimated noise power.

In an embodiment, edge based wideband sensing may be summarized as follows:

1) Using the product of normalized multi-scale wavelet transform to detect the edges of the signal spectrum;
2) Setting a threshold for the local maxima of the normalized wavelet product to prevent keeping too many fake edges;
3) Proposing a multi-band detection to classify the bands as occupied or vacant, after forming the possible bands based on the detected edges;
4) Presenting an efficient method to estimate the SNR of each occupied band;

In an embodiment, the product of wavelet transforms at different scales is used to detect the edges (sharp changing points) of the power spectral density (PSD) of the received signal. Possible bands are then formed based on the detected edges. Thereafter, a multi-band detection scheme is applied to classify the bands as occupied or vacant. Finally, the signal to noise ratio (SNR) of each occupied band is estimated.

Energy Comparison Multi-Band Sensing

The following describes an embodiment for energy comparison multi-band sensing. Based on the initial edge detection (steps 1 to 7 of the above EWS Algorithm), the possible bands within the frequency range have been formed. Also, the average PSD of each band has been obtained. Next, the process of classifying each band as occupied or vacant is considered. In an embodiment, this could be done by comparing the average PSD with the noise power, if the noise power is known a priori. Accurate knowledge on the noise power is thus the key to this approach. Unfortunately, in practice, noise uncertainty always exists, that is, noise power usually changes with time and location. Due to the noise uncertainty, it is virtually impossible to obtain an accurate measure of noise power. Inaccurate estimation of the noise power may cause this approach to be unreliable.

To avoid the above problem, an embodiment uses the special properties of large bandwidth for real-time noise power estimation. Within the large frequency range, it is very likely that there are a few vacant frequency intervals. Therefore, the average PSD on such intervals should approach the noise power. Due to the edge detection, for example, as described above, the whole frequency range is successfully divided into a number of bands. It is therefore natural to choose the average PSD of a few bands with least PSDs as the noise power estimation. In an embodiment, energy comparison multiband sensing (ECMS) is based on this idea. In an embodiment, the detection is based on the ratio of a band PSD to the minimum band PSD and a hard threshold.

Figure 2:
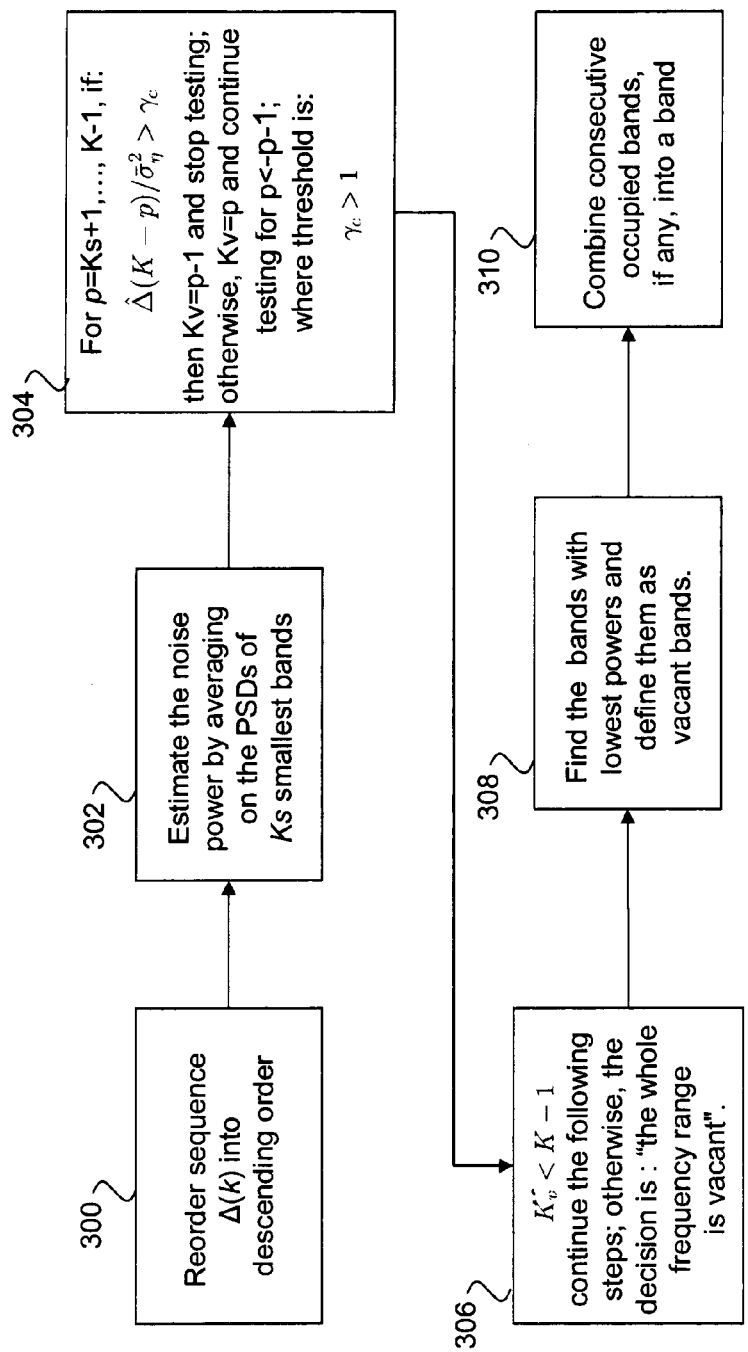
FIG. 2 is a flow diagram of a method for energy comparison multi-band sensing according to an embodiment.

The following describes an embodiment of a method for energy comparison multi-band sensing. FIG. 2 illustrates the embodiment as a flow diagram.

Algorithm 2: Energy comparison multi-band sensing (ECMS)

1) In 300, reorder sequence Δ(k) into Δ̂(k) with descending order, where Δ(k) is the average PSD of band k, k = 1, 2, ..., K − 1.
2) In 302, estimate the noise power by averaging on the PSDs of $K_s$ smallest bands (i.e. minimum power spectral density):

$$\overline{\sigma}_\eta^2 = \frac{1}{K_s}\sum_{n=1}^{K_s} \hat{\Delta}(K-n). \quad (12)$$

where $K_s$ is a design parameter and K is the number of detected edges. For example, $K_s$ = 1.

3) In 304, for p = $K_s$ + 1, ..., K − 1, if:
$\hat{\Delta}(K-p)/\overline{\sigma}_n^2 > \gamma_c$,
then $K_v$ = p − 1 and stop testing; otherwise, $K_v$ = p and continue testing for p ← p + 1; where $\gamma_c$ > 1 is a threshold. $K_v$ is the number of detected vacant bands (channels).
4) In 306, if $K_v$ < K − 1, continue the following steps; otherwise, the decision is $\mathcal{H}_0$: "the whole frequency range is vacant".
5) In 308, find the $K_v$ bands with the lowest powers and define them as vacant bands.
6) In 310, combine consecutive occupied bands, if any, into a band.

The choice of $K_s$ has an impact on the detection. In an embodiment, if some a priori knowledge of the occupancy probability in known, a reasonable value for it may be obtained. In an embodiment, if no a priori knowledge is known, a good choice is $K_s$=1, that is, all bands are compared with the least average power band.

The above-described embodiment provides a technique for sensing a very large frequency range. The above-described embodiment includes two major steps: 1) edge detection using multiscale wavelet transform, and 2) multiband detection using energy comparison.

As mentioned above, edge detection in the received signal may be difficult because: (1) the signal may also have sharp changes within a band; (2) at low signal to noise ratio (SNR) level, the edges contributed by noise may have significant impact; and (3) the ends of an occupied band may not be sharp enough. The above-described embodiment provides the following contributions to overcome these difficulties: (1) the wavelet product is normalized by the mean of the PSD to combat noise uncertainty; (2) a threshold is provided for the local maxima of the normalized wavelet product to prevent keeping too many fake edges; (3) after forming the possible bands based on the detected edges, a multi-band detection classifies the bands as occupied or vacant; and (4) a method is provided for estimating the SNR of each occupied band.

An advantage of the above-described embodiments is that wideband sensing is performed without requiring prior information of the source signal and noise power. Furthermore, it is an advantage of the above-described embodiment that the bandwidth and centre frequencies of each band do no need to be known a priori, i.e. before wideband sensing to identify one or more frequency bands.

It is an advantage of the above-described embodiments that a wideband sensing technique is provided which can handle sharp changes of the source signal within an occupied band. It is an advantage of the above-described embodiments that a wideband sensing technique is provided which can handle the edges generated or contributed by noise. It is an advantage of the above-described embodiments that a wideband sensing technique is provided which can handle the ends of an occupied band not being sharp.

Performance Metrics and Threshold

The following describes an exemplary method for evaluating performance of a method for identifying one or more frequency bands in a received signal. In an embodiment, the method is performed by an apparatus, such as, for example, a computing device, such as, for example, a laptop.

Performance evaluation in wideband sensing is much more complicated than in single-band or multi-band sensing, where the band locations are known a priori. For single-band or multi-band sensing, it is possible to use the probability of detection ($P_d$) and the probability of false alarm ($P_{fa}$) for each band to evaluate the performance of a detection method. This is not enough for wideband sensing, as the band locations within the frequency range are unknown and the estimation accuracy of them is itself a critical performance metric. Therefore, adequate metrics must be defined for evaluating this performance as well. In an embodiment, in addition to evaluating performance using the $P_d$ and $P_{fa}$ for the whole frequency range, three other criteria are used to evaluate the wideband sensing performance. Each criteria is described in detail below. The three criteria evaluate a given method from different aspects.

Performance Metrics

In an embodiment, the first metric is the $P_d$ and $P_{fa}$ for the whole frequency range, defined as $$P_d = \mathbb{P} \text{ (at least one band detected as occupied} | \mathcal{H}_1) \quad (13)$$

$$P_{fa} = \mathbb{P} \text{ (at least one band detected as occupied} | \mathcal{H}_0), \quad (14)$$

where $\mathbb{P}$ (ξ) means the probability of a random event ξ.

In an embodiment, a subcarrier occupancy index (SOI) of a subcarrier is defined as 1 or 0 if the subcarrier is occupied or vacant, respectively. A natural way to evaluate the detection performance at subcarrier granularity is therefore a subcarrier occupancy error rate (SOER). The SEOR is the error rate for identifying each subcarrier, where a subcarrier is a frequency point. In an embodiment, the SOER is defined as:

$$SOER = \frac{\sum_{n=0}^{N-1} |SOI_a(n) - SOI_d(n)|}{N}, \quad (15)$$

where $SOI_a(n)$ and $SOI_d(n)$ are the actual and detected SOI for subcarrier n, respectively.

However, SOER does not take the signal strength into consideration. If the PSD of an occupied subcarrier is very small (near noise power), it is very likely that the subcarrier is detected as vacant and this is acceptable in many situations. In this case, the detection error should be treated as smaller than that when an occupied subcarrier with large PSD is detected as vacant. To reflect this point, each subcarrier is given a subcarrier occupancy degree (SOD). In an embodiment, the SOD is defined as:

$$SOD(n) = \begin{cases} v(n), & \text{subcarrier } n \text{ occupied} \\ 0, & \text{otherwise} \end{cases}, \quad (16)$$

where v(n) is the SNR of subcarrier n. A wideband spectral error (WSE) is defined as the mean square error of the SOD function. In an embodiment, the WSE is defined as:

$$WSE = \frac{\sum_{n=0}^{N-1} |SOD_a(n) - SOD_d(n)|^2}{\sum_{n=0}^{N-1} |SOD_a(n)|^2}, \quad (17)$$

where $SOD_a(n)$ and $SOD_d(n)$ are the actual and detected SOD for subcarrier n, respectively.

These two criteria are at the subcarrier granularity. In practice, a source signal usually occupies a continuous frequency range (a band). Even if the average PSD of the band is high, at some subcarrier within the band the PSD may be low such that it is likely to be detected as vacant. Hence the detection accuracy on 'band' granularity may be more interesting than on 'subcarrier' granularity. For this, a band occupancy degree (BOD) is defined. In an embodiment, the BOD is defined as:

$$BOD(k) = \begin{cases} \lambda(k), & \text{band } k \text{ occupied} \\ 0, & \text{otherwise} \end{cases}, \quad (18)$$

where $\lambda(k)$ is the average SNR of band k. Each subcarrier n should belong to one band, say, band b(n), $1 \le b(n) \le L$, where L is the total number of bands. A band occupancy error (BOE) is defined as the mean square error of the BOD function. In an embodiment, the BOE is defined as:

$$BOE = \frac{\sum_{n=0}^{N-1} |BOD_a(b_a(n)) - BOD_d(b_d(n))|^2}{\sum_{n=0}^{N-1} |BOD_a(b_a(n))|^2}, \quad (19)$$

where $BOD_a(k)$ and $BOD_d(k)$ are the actual and detected BOD for band k, respectively.

In summary, $P_d$ and $P_{fa}$ only represent the detection performance in identifying the whole frequency range as occupied or vacant, while SOER, WSE and BOE give detailed detection performance within the frequency range.

The above-described embodiment provides a technique for evaluating the performance of a wideband sensing method. The above-described method defines new performance metrics for evaluating performance, i.e. SOER, WSE and BOE.

Threshold Setting

As shown above, the performance metrics for wideband sensing are much more complicated than is the case for single-band or multiband sensing. Theoretical analysis on the performance of wideband sensing is therefore much more challenging.

Setting the thresholds to meet the predetermined requirements is also more difficult. The threshold should be set such that certain requirements can be met. Since little or no information of the signal is known (actually, in an embodiment, it is not even known if there is a signal or not), usually the threshold is chosen based on the $P_{fa}$ under hypothesis $\mathcal{H}_0$ (no signal case).

In an embodiment, the edge based wideband sensing has two detection phases: an edge detection phase and a multiband detection phase. In an embodiment, two thresholds are used: one for the edge detection and the other for the multiband detection. Obviously, a false alarm occurs if, and only if, at least one edge is detected at the edge detection phase and at least one band is classified as occupied at the multiband detection phase. Therefore:

$$P_{fa} = \mathbb{P}(\text{at least one band detected as occupied} | \mathcal{H}_0) \quad (20)$$
$$= \mathbb{P}\left(\left(\max_n(F_N(n)) > \gamma_e\right) \text{ and } \left(\max_k(\Delta(k)) > \gamma_c \Lambda(K_s)\right) \middle| \mathcal{H}_0\right),$$

where $\Lambda(K_s)$ is the average value of least $K_s$ elements in $\Delta(k)$. Obtaining a closed form expression of (20) as a function of $\gamma_e$ and $\gamma_c$, makes it possible to obtain the thresholds to meet the $P_{fa}$ requirement.

In an embodiment, a closed form expression may be found for the distribution of F(n) for the special case of J=2. For J>2, it is an intractable mathematical problem to find a closed form solution. Simulation has shown that multiple-term Gaussian mixture is a good approximation to the probability density function (PDF) of F(n) in general. However, the parameters in the mixture may be determined by simulations. If the distribution of F(n) is found, it is not difficult to find the distribution of $F_N(n)$.

F(n) are essentially independent at different n for white Gaussian input. Hence, the PDF of $\max_n(F_N(n))$ can be found given the PDF of $F_N(n)$. The most difficult part lies on the distribution of $\Delta(k)$ and $\max_k(\Delta(k))$. Note that the detected bands are related to the edge detection phase. Hence the distribution of $\Delta(k)$ should be conditioned on the possible edge locations detected at the first phase. In an embodiment, the thresholds can also be found by using computer simulations. In an embodiment, the thresholds are not related to signal property and noise power, and can be determined once for all.

Simulations

In order to evaluate the performance of the above-described embodiments for identifying frequency bands in a received signal, various simulations were performed. It is assumed that the received wideband signal has been down-converted to the baseband. The following three simulation scenarios are considered:

Scenario one: the sensed bandwidth is $B_w$, =100 MHz and there are four occupied channels with bandwidth 6 MHz whose center frequencies (at baseband) are −37 MHz, −17 MHz, 13 MHz, 38 MHz, respectively. The signal at each occupied channel is a linear Chirp.

Scenario two: the sensed bandwidth is 21.52 MHz and there are two occupied ATSC DTV channels with center frequencies −5.38 MHz and 5.38 MHz, respectively. The bandwidth of each channel is supposed to be 6 MHz; however, the edges of the channels are not sharp and therefore the actual bandwidth depends on interpretation.

Scenario three: the sensed bandwidth is 24.75 MHz and there are two occupied wireless microphone signal channels. The bandwidth of the two channels is supposed to be 50 KHz; however, the edges of the channels are not sharp and therefore the actual bandwidth depends on interpretation.

It is assumed that the receiver (sensor) does not have any information on signal property, center frequencies, bandwidths and noise power.

The wideband SNR of the received signal is defined as the ratio of signal power to the noise power in the whole sensed frequency range. The SNR within each occupied channel is called channel SNR. The channel SNRs at different channels are usually different. In the simulations, at a fixed wideband SNR, the channel SNRs at scenario one are independently generated random numbers and different at different Monte-Carlo tests. For scenarios two and three, the signal at each occupied channel is the captured DTV signal.

The FFT size is chosen as N=2048 and sensing time (accumulated sampling time) is 5 ms (milli second). For ECMS, a value of $K_s=1$ is chosen. The threshold is set such that $P_{fa}=0.0004$.

Figure 3:
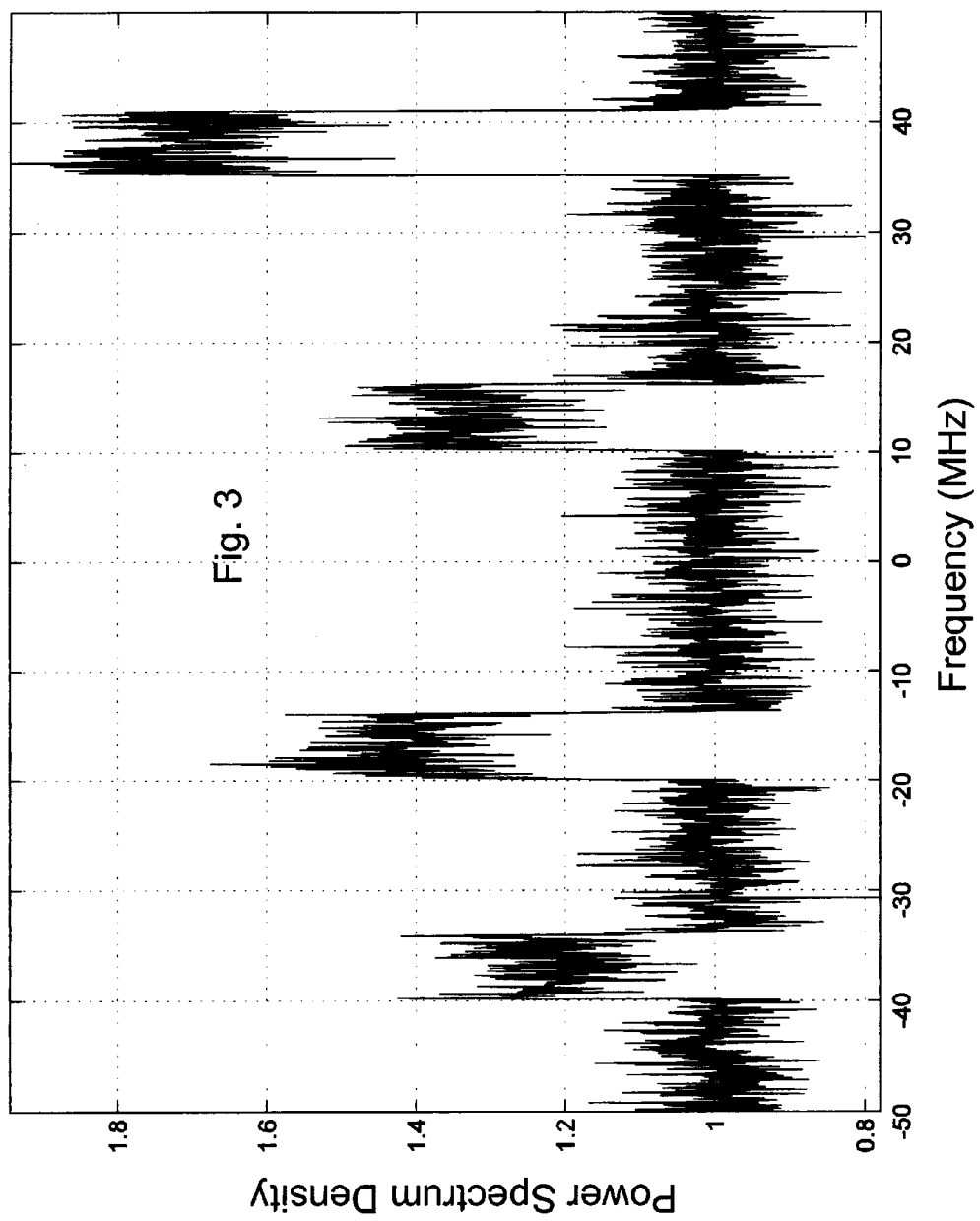
FIGS. 3 to 7 show simulation results relating to simulation scenario one.
Figure 4:
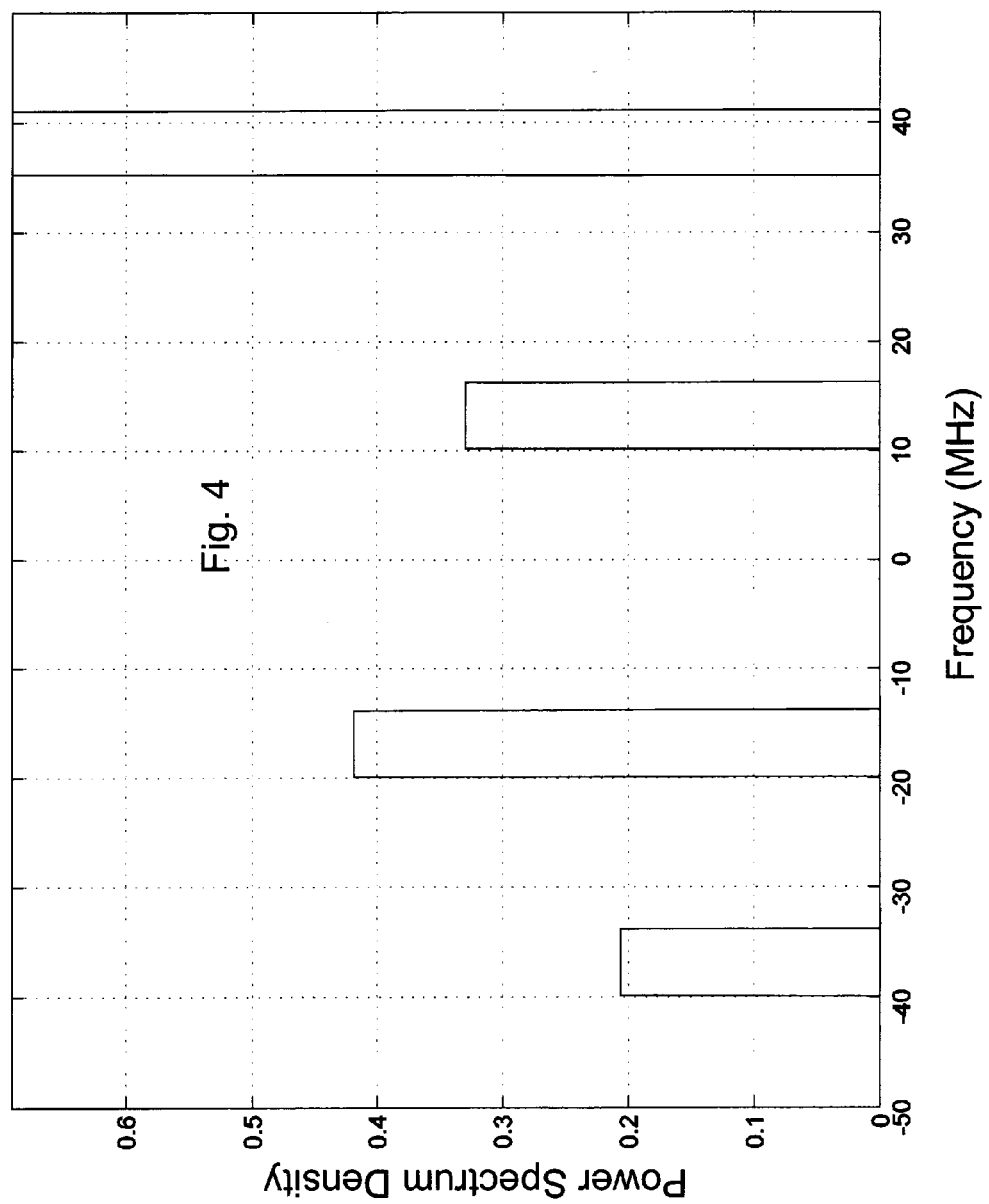
Figure 5:
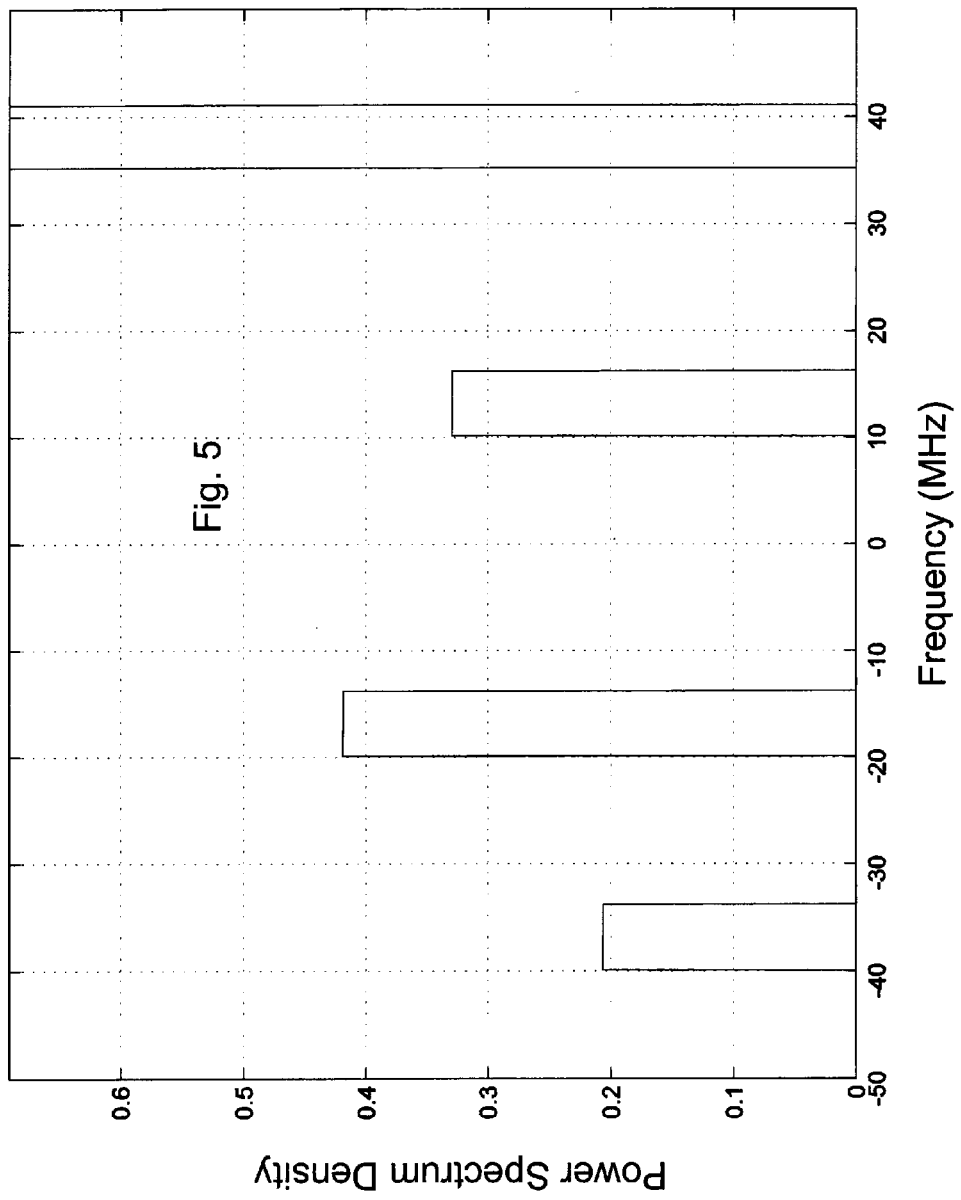
Figure 6:
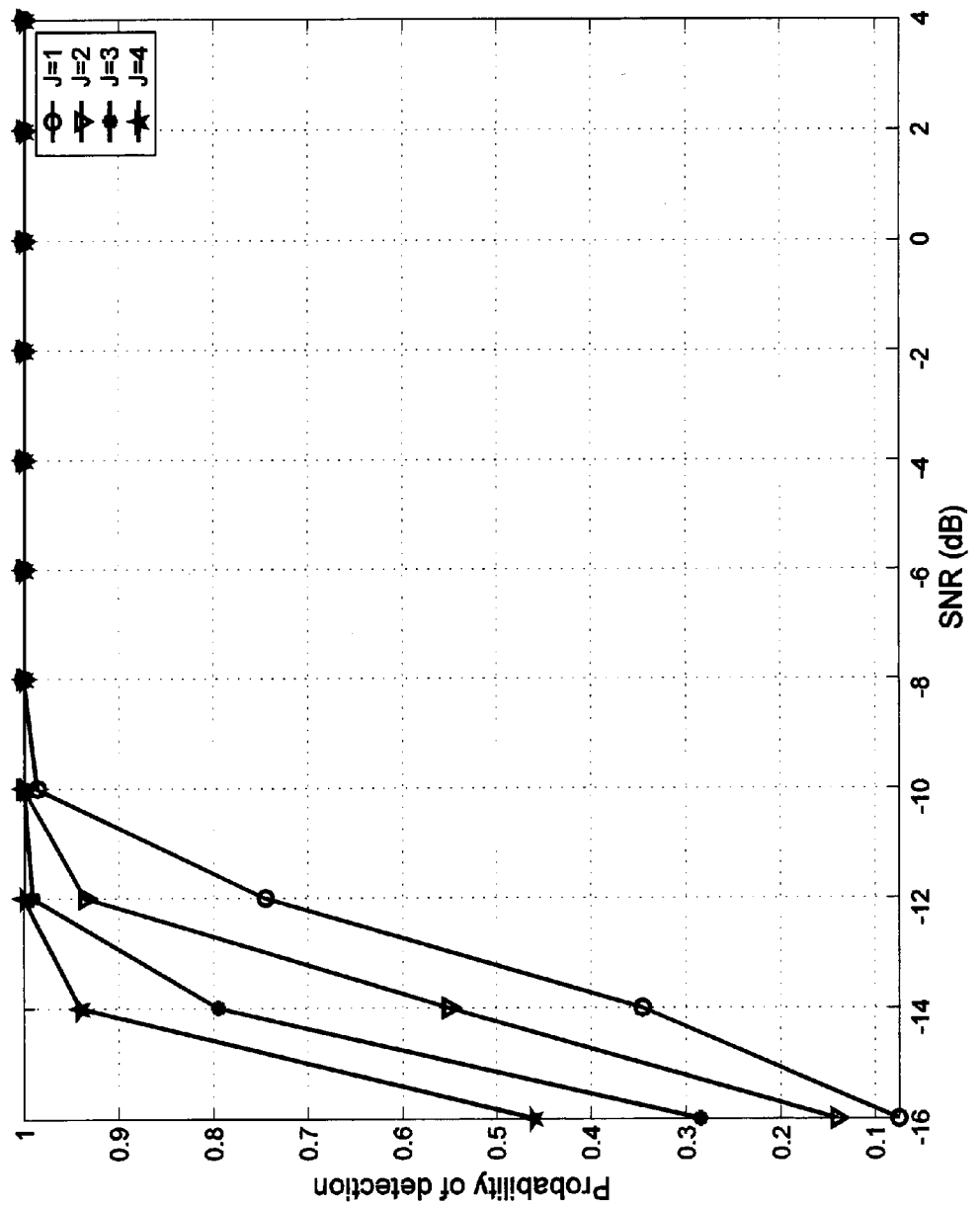
Figure 7:
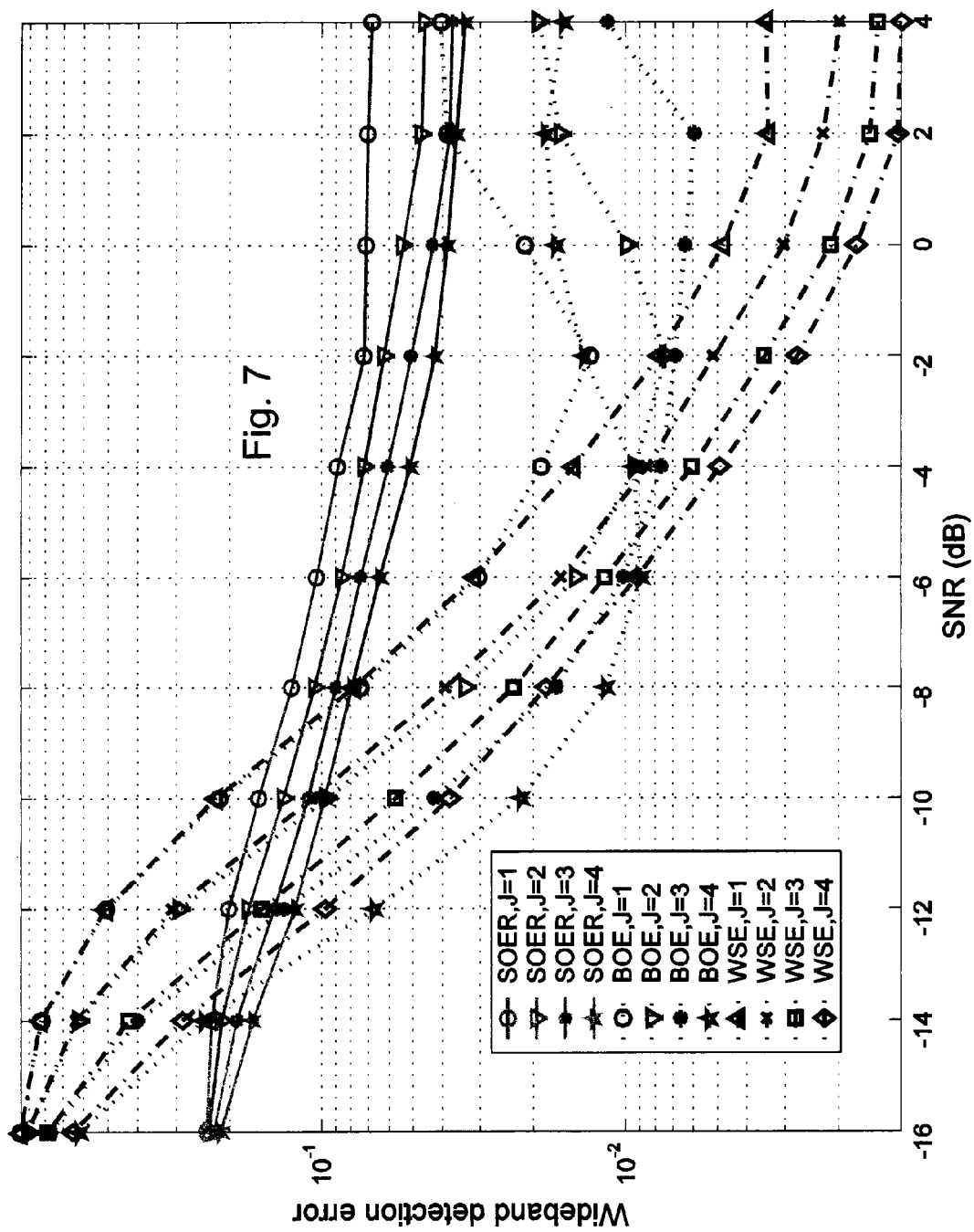

In scenario one, with wideband SNR at −10 dB, the received signal PSD, the actual BOD and the detected BOD (J=4) are shown in FIGS. 3 to 5 at one Monte-Carlo test. At this test, the method well detected the four occupied bands (in terms of band edges and band SNR). The $P_d$ for the detection in the whole frequency range and the detailed performance for the proposed method are given in FIG. 6 and FIG. 7, respectively, (based on 200 Monte-Carlo tests). From the figures, it can be seen that larger J is likely to give better performance, especially at low SNR, and the method usually gives good band location and BOD estimations for J≥3.

Figure 8:
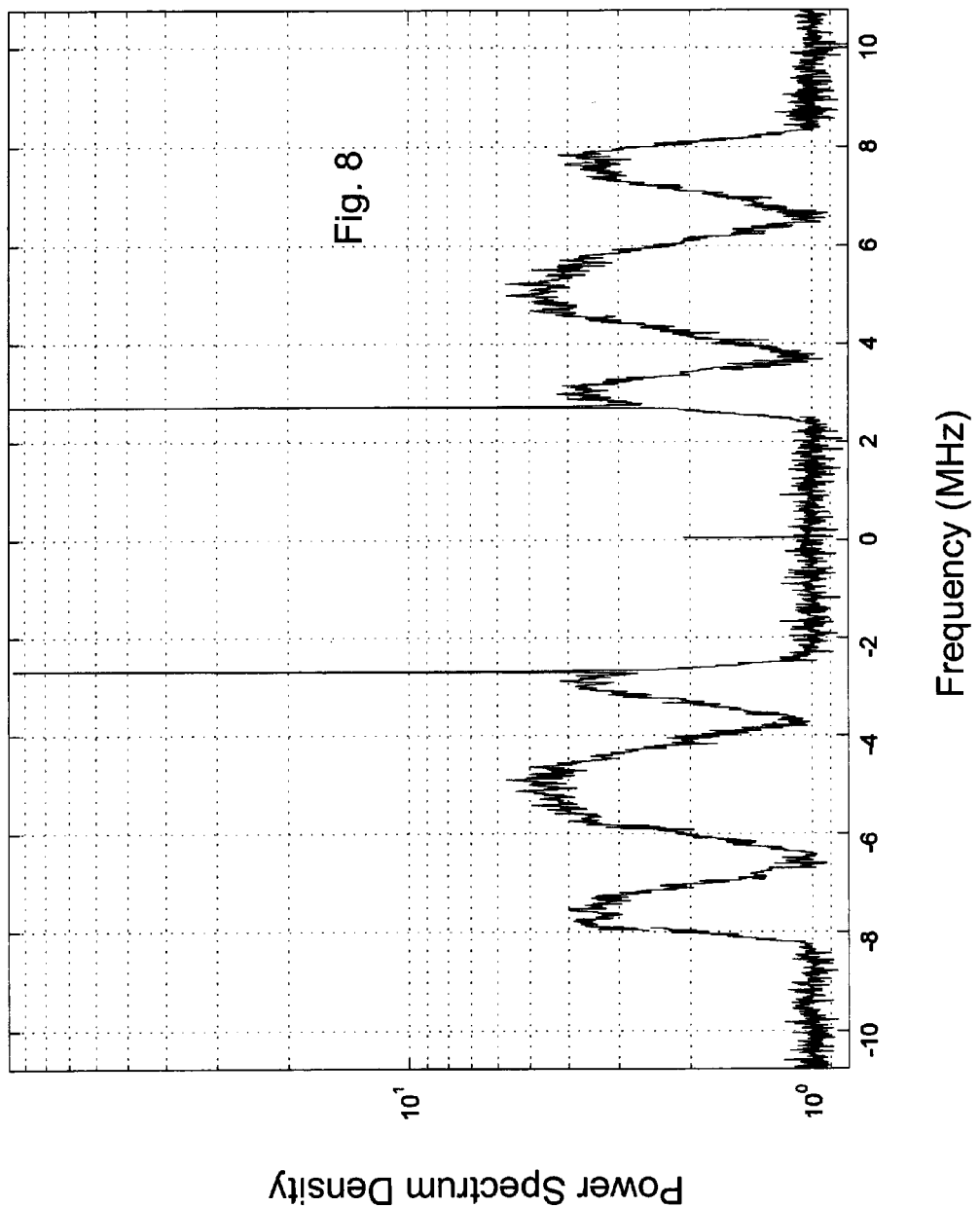
FIGS. 8 to 12 show simulation results relating to simulation scenario two.
Figure 9:
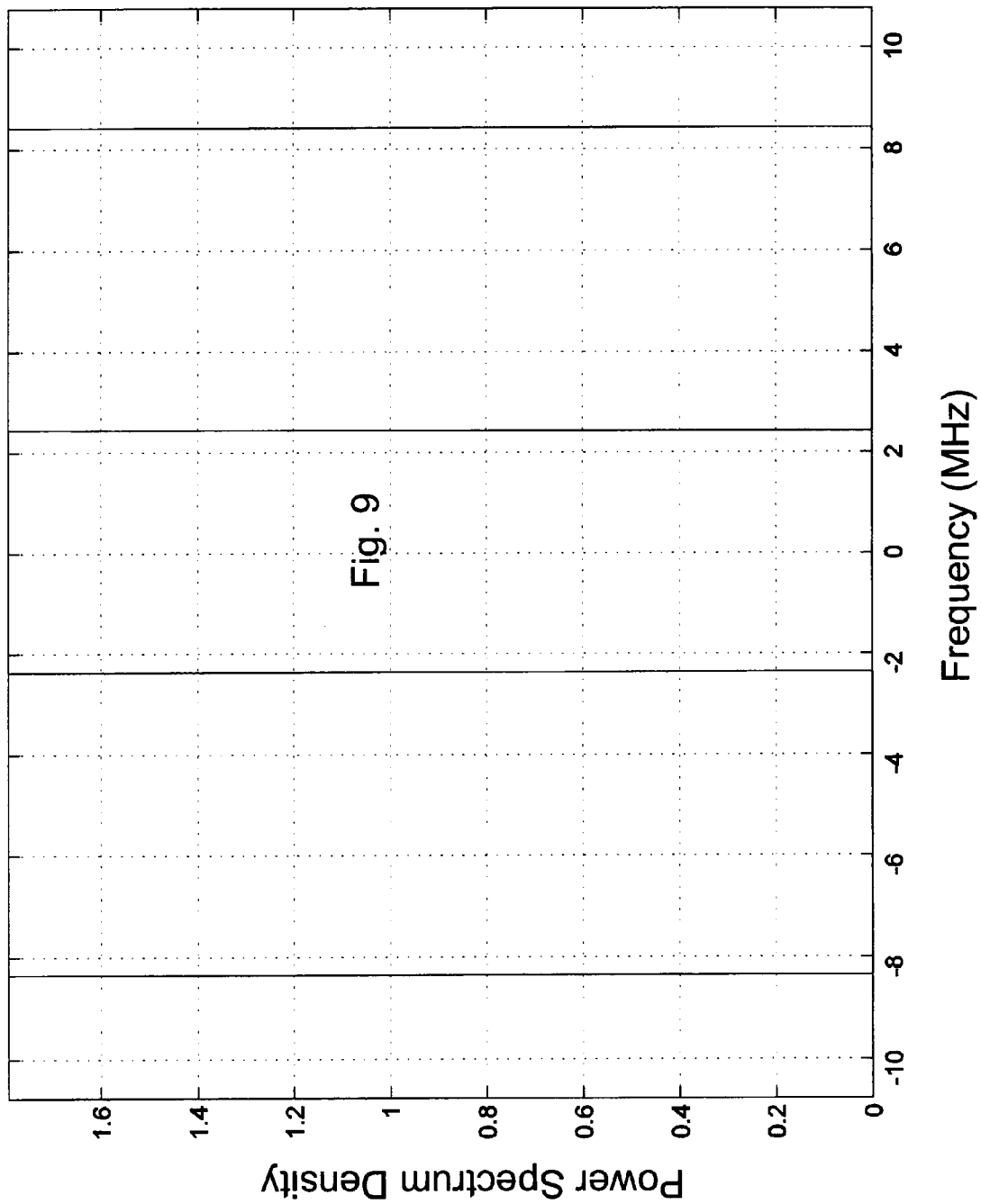
Figure 10:
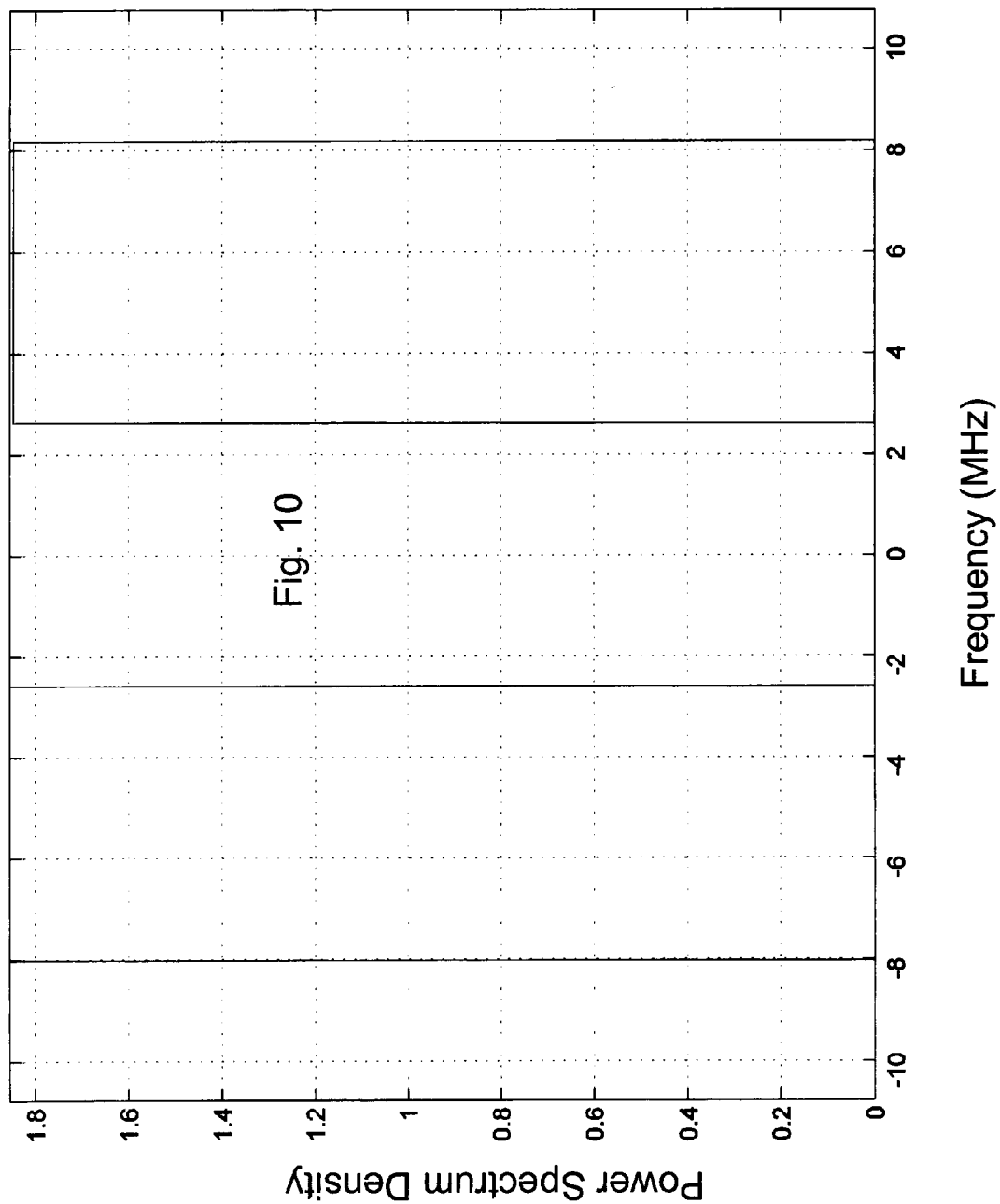
Figure 11:
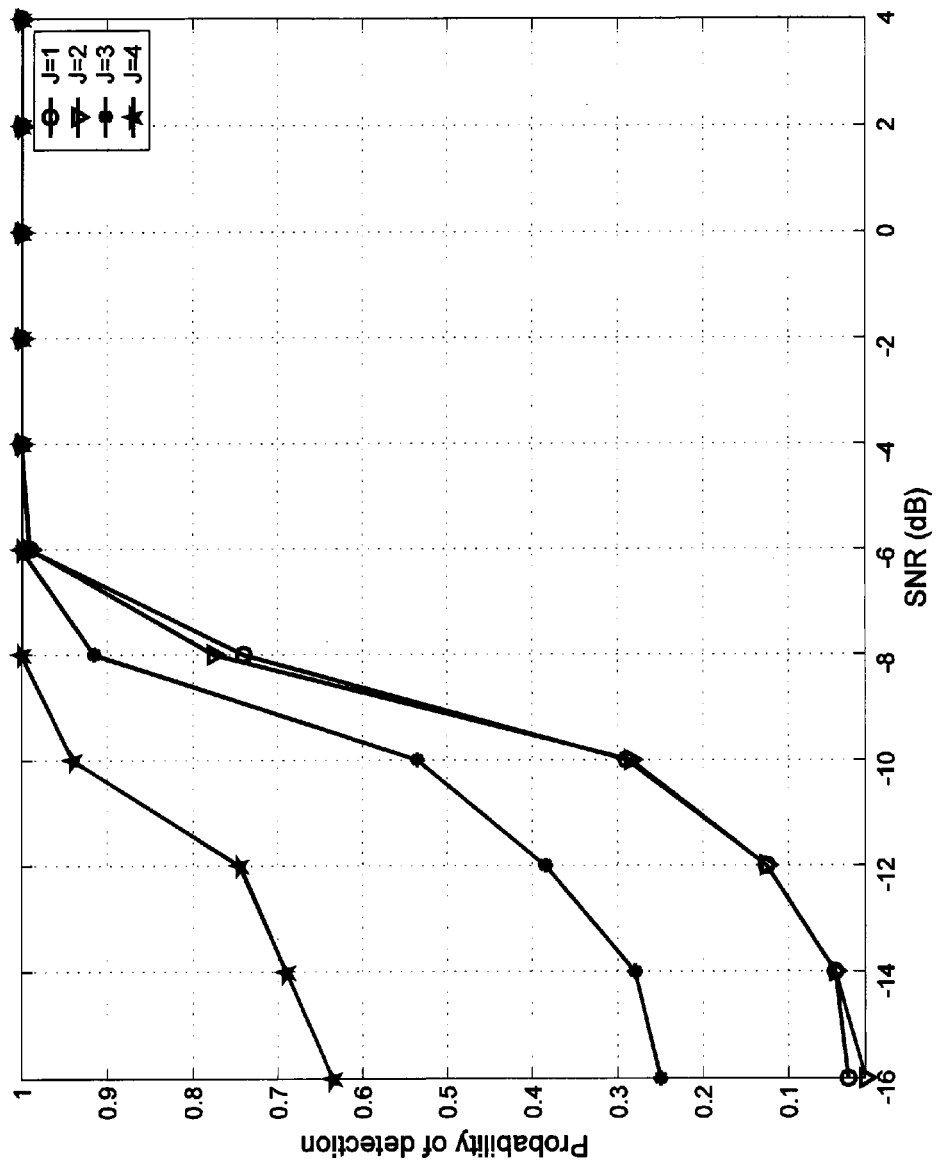
Figure 12:
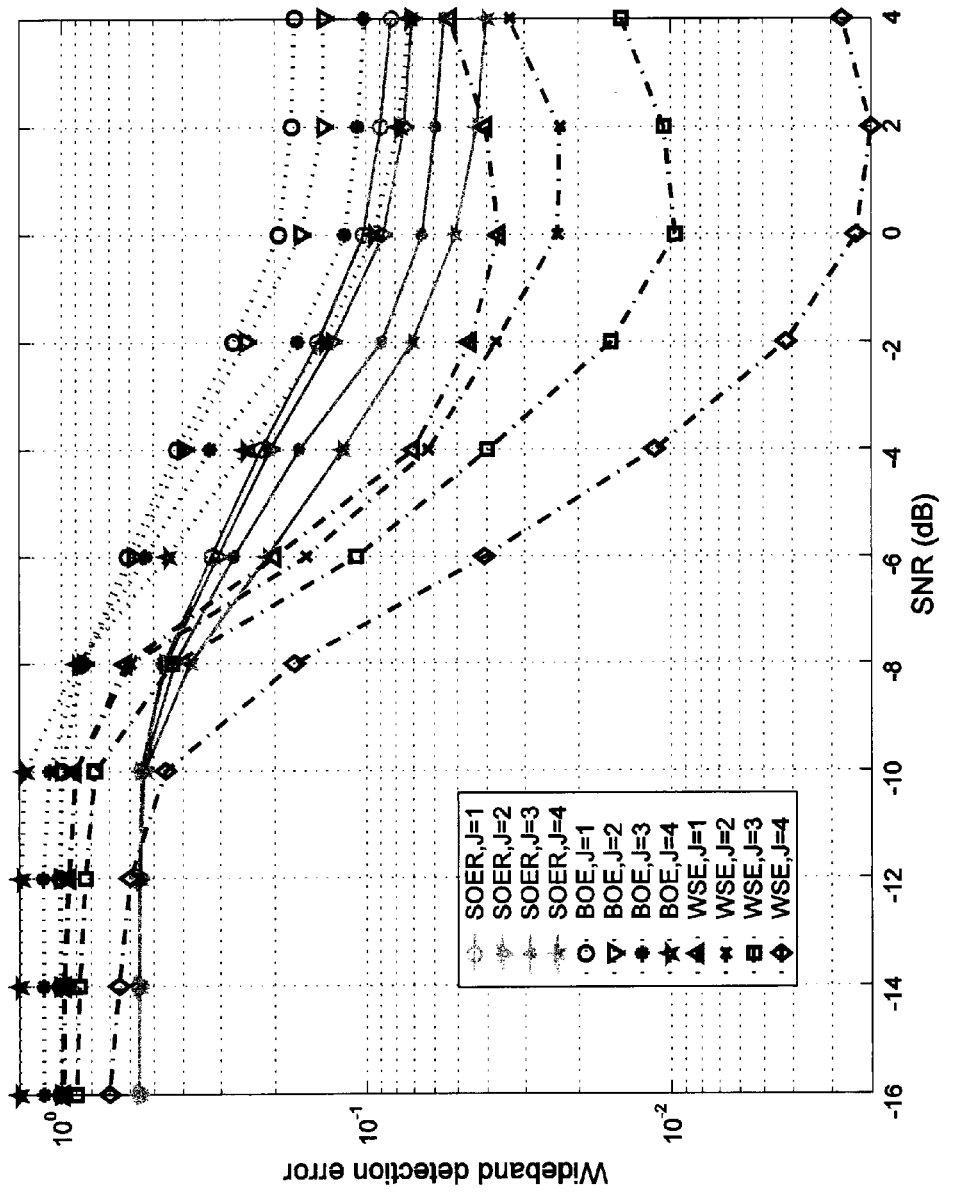

In scenario two, with wideband SNR at 0 dB, the received signal PSD, the actual BOD and the detected BOD are shown in FIGS. 8 to 10 at one Monte-Carlo test. The method detected two bands with bandwidth slightly smaller than 6 MHz. This is due to the relatively smooth edges of the bands. It is noted that the method suppressed the single carrier noise at frequency point 0. This is a useful property since in practice unwanted spurious signals generated by other electronic devices or other transmitters usually exist. It is desirable if they can be suppressed at the detection so that they do not cause a false alarm. The $P_d$ for the detection in the whole frequency range and the detailed performance for the proposed method are given in FIG. 11 and FIG. 12, respectively, (based on 200 Monte-Carlo tests). The observations for scenario one are still valid for scenario two. However, the BOD estimation is in general worse than that for scenario one because the band edges are not as sharp.

Figure 13:
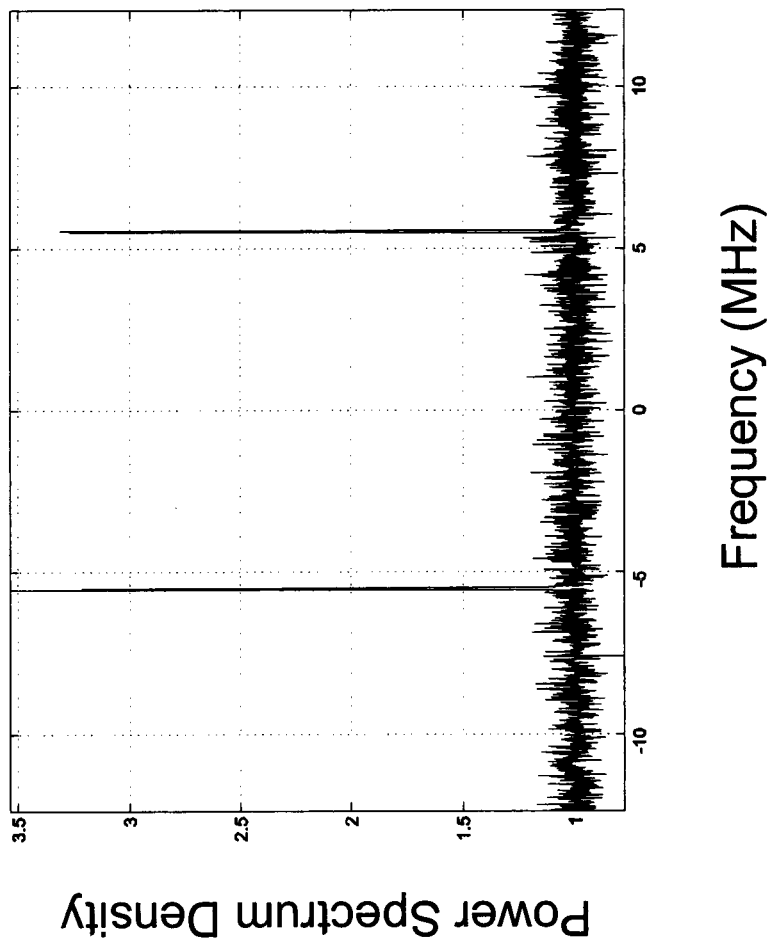
FIG. 13 shows simulation results relating to simulation scenario three.

In scenario three, with wideband SNR at −20 dB, the captured signal spectrum is shown in FIG. 13 at 20 Monte-Carlo tests. The method detected a probability of detection is 1 and an average bandwidth of 64 KHz.

The above-described simulations show the above-described embodiment is effective for wideband sensing.

Some embodiments may be suitable for application in any wired or wireless communication systems to find available spectrum within any specified frequency range. Some embodiments may be suitable for application in television white space cognitive radio, IEEE 802.11 TVWS, 802.22, etc.

Next will be described a mobile communication device and its operation with reference to FIGS. 14 and 15. The mobile communication device may provide an operating environment for some embodiments. For example, the mobile communication device may provide an environment for the above-described wideband sensing method, or the above-described method for evaluating performance of a wideband sensing method.

Figure 14:
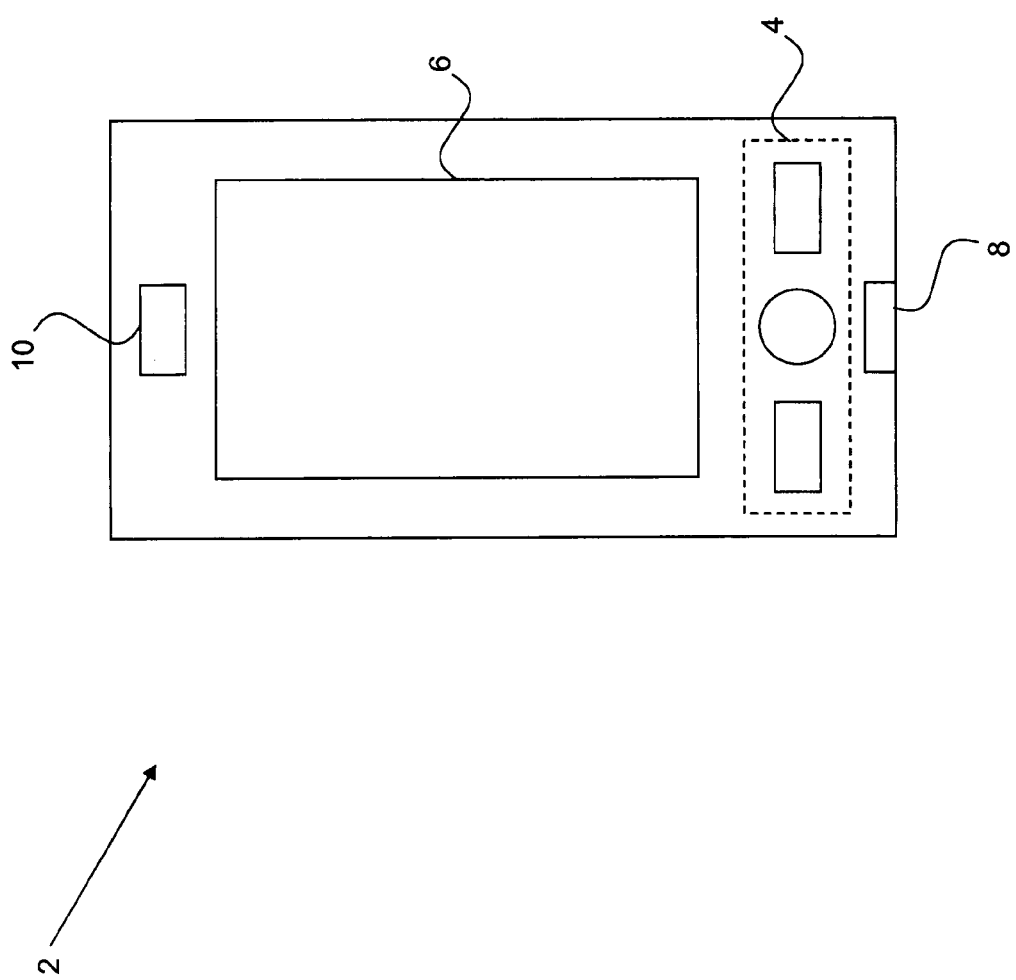
FIG. 14 is a schematic diagram of a mobile communication device within which some embodiments may operate.

FIG. 14 represents a mobile communication device 2 which comprises a keypad 4, a touch-screen 6, a microphone 8, a speaker 10 and an antenna (not shown). The device 2 is capable of being operated by a user to perform a variety of different functions, such as, for example, hosting a telephone call, sending an SMS message, browsing the internet, sending an email and providing satellite navigation.

Figure 15:
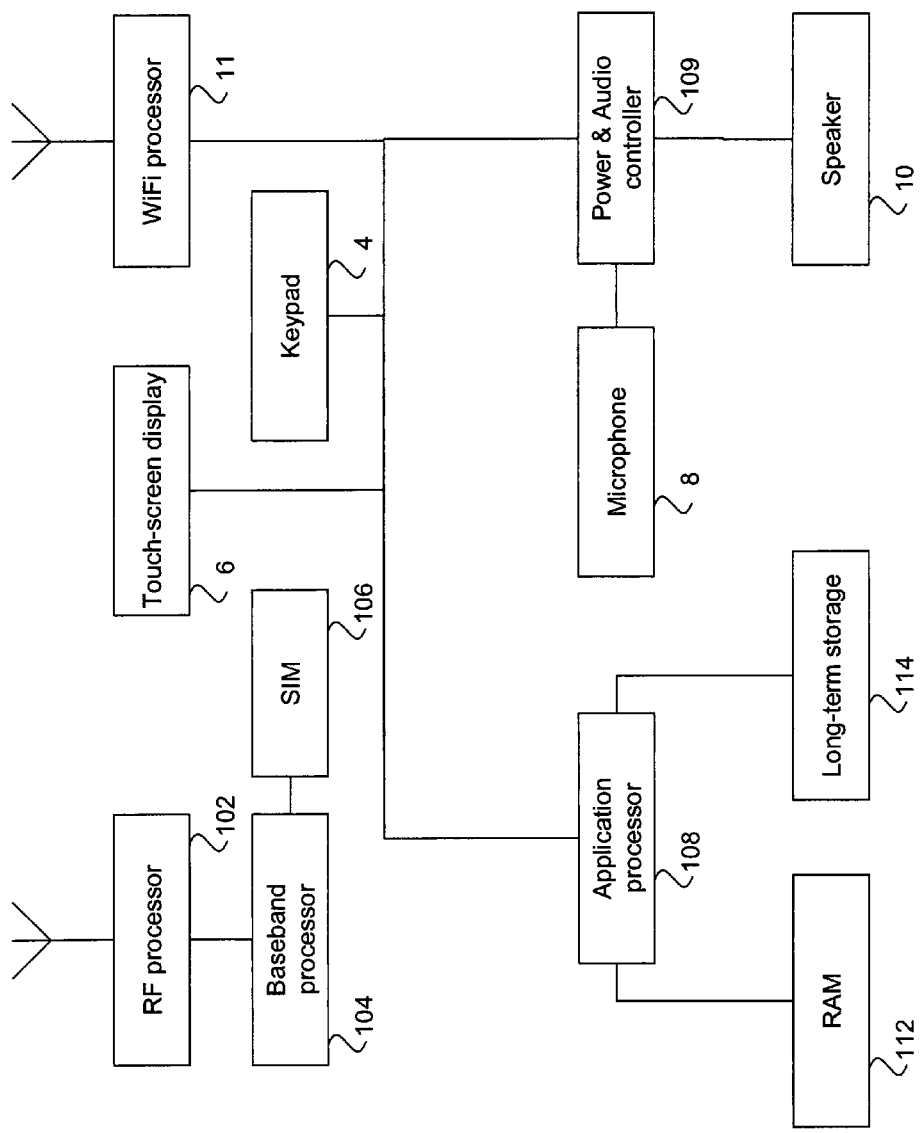
FIG. 15 is a schematic diagram of some internal parts of the mobile communication device of FIG. 14.

FIG. 15 shows a schematic view of some of the internal hardware elements of the device 2. With reference to FIG. 15, the device 2 comprises hardware to perform telephony functions, together with an application processor and corresponding support hardware to enable the device to have other functions, such as messaging, internet browsing, email functions, satellite navigation and the like.

In FIG. 15, the telephony hardware is represented by the RF processor 102 which provides an RF signal to the antenna for the transmission of telephony signals, and the receipt therefrom. Additionally provided is baseband processor 104, which provides signals to and receives signals from the RF processor 102. The baseband processor 104 also interacts with a subscriber identity module 106, as is well known in the art. The telephony subsystem of the device 2 is beyond the scope of the present invention.

The keypad 4 and the touch-screen 6 are controlled by an application processor 108. A power and audio controller 109 is provided to supply power from a battery (not shown) to the telephony subsystem, the application processor 108, and the other hardware. The power and audio controller 109 also controls input from the microphone 8, and audio output via the speaker 10. Also provided is a WiFi processor and antenna 11 which is controlled by the application processor 108. The WiFi processor and antenna 11 is capable of sending and receiving data using the WiFi communication standard.

In order for the application processor 108 to operate, various different types of memory are provided. Firstly, the device 2 includes Random Access Memory (RAM) 112 connected to the application processor 108 into which data and program code can be written and read from at will. Code placed anywhere in RAM 112 can be executed by the application processor 108 from the RAM 112. RAM 112 may represent a volatile memory of the device 2.

Secondly, the device 2 is provided with a long-term storage 114 connected to the application processor 108. The long-term storage 114 comprises three partitions, an operating system (OS) partition, a system partition and a user partition. The long-term storage 114 may represent a non-volatile memory of the device 2.

In an example, the OS partition contains the firmware of the computing device which includes an operating system. Other computer programs may also be stored on the long-term storage 114, such as application programs, and the like. In particular, application programs which are mandatory to the device, such as, in the case of a communication device, communications applications and the like are typically stored in the system partition. The application programs stored on the system partition would typically be those which are bundled with the device by the device manufacturer when the phone is first sold. Application programs which are added to the device by the user would usually be stored in the user partition.

As stated, the representation of FIG. 15 is schematic. In practice, the various functional components illustrated may be substituted into one and the same component. For example, a single processor may provide the functionality of the RF processor, the baseband processor, the WiFi processor and the application processor. Furthermore, in some embodiments, one or more elements of FIG. 15 may be omitted.

While the invention has been particularly shown and described with reference to specific example embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for identifying one or more frequency bands in a received signal, the method comprising:
   a) calculating a normalized wavelet product of the received signal, wherein the normalized wavelet product is:

$$F_N(n)=|F(n)|/\Delta^J$$

where $$F(n) = \prod_{j=1}^{J} W_{2^j} P(n),$$

$W_{2^j}$ is the continuous wavelet transform having a scale of $2^j$ and $P(n)$ is the power spectral density at subcarrier n of the received signal, and $\Delta$ is the mean power spectral density of the received signal calculated as follows:

$$\Delta = \frac{1}{N}\sum_{n=0}^{N-1} P(n);$$

b) setting a threshold for local maxima of the normalized wavelet product; and c) detecting one or more edges in the received signal based on local maxima of the normalized wavelet product which are greater than the threshold to identify one or more frequency bands in the received signal.

2. The method of claim 1, wherein a fixed threshold is set for a given fast Fourier transform size and sample size of the received signal.

3. The method of claim 1, further comprising calculating a mean power spectral density for an identified frequency band.

4. The method of claim 3, wherein the mean power spectral density of a band $[l_k, l_{k+1}]$ is calculated as follows:

$$\Delta(k) = \frac{1}{l_{k+1}-l_k+1} \sum_{n=l_k}^{l_{k+1}} P(n).$$

where $P(n)$ is the power spectral density at subcarrier n of the received signal.

5. The method of claim 3, further comprising detecting if the identified frequency band is being used based on a ratio of a mean power spectral density of the identified frequency band to a minimum power spectral density and a predetermined threshold.

6. The method of claim 5, wherein the identified frequency band is detected as being used based on comparing the mean power spectral density of the identified band divided by the minimum power spectral density with the predetermined threshold.

7. The method of claim 5, wherein if no frequency bands are detected as used the whole frequency range of the received signal is identified as vacant.

8. The method of claim 5, wherein the minimum power spectral density corresponds to the mean power spectral density of one or more identified frequency bands having the lowest power spectral density among the identified frequency bands.

9. The method of claim 8, wherein the minimum power spectral density comprises an average of the mean power spectral density of two or more identified frequency bands having the lowest mean power spectral density among the identified frequency bands.

10. The method of claim 9, wherein the minimum power spectrum is:

$$\overline{\sigma}_\eta^2 = \frac{1}{K_s}\sum_{n=1}^{K_s} \hat{\Delta}(K-n).$$

where $K_s$ is the number of identified frequency bands having the lowest mean power spectral density among the identified frequency bands, K is the number of detected edges, and $\hat{\Delta}(k)$ is the mean power spectral density sequence in descending order.

11. The method of claim 5, further comprising combining consecutive frequency bands detected as being used.

12. The method of claim 5, further comprising calculating an estimated noise power as the mean power spectral density of all identified frequency bands detected as not being used, and calculating a mean signal to noise ratio for each identified frequency band detected as being used based on the estimated noise power.

13. The method of claim 1, further comprising sensing a frequency range of the received signal, wherein the frequency range bounds a portion of the frequency spectrum within which one or more frequency bands are to be identified.

14. The method of claim 1, further comprising receiving the received signal.

15. An apparatus comprising:
at least one processor; and
at least one memory including a non-transitory computer-readable medium further including computer program code;
the non-transitory computer-readable medium and the computer program code being configured, with the at least one processor, to cause the apparatus to perform at least the following:
calculate a normalized wavelet product of the received signal, wherein the normalized wavelet product is:

$$F_N(n)=|F(n)|/\Delta^J$$

where $$F(n) = \prod_{j=1}^{J} W_{2^j} P(n),$$

$W_{2^j}$ is the continuous wavelet transform having a scale of $2^j$ and $P(n)$ is the power spectral density at subcarrier n of the received signal, and $\Delta$ is the mean power spectral density of the received signal calculated as follows:

$$\Delta = \frac{1}{N}\sum_{n=0}^{N-1} P(n);$$

set a threshold for local maxima of the normalized wavelet product; and
detect one or more edges in the received signal based on local maxima of the normalized wavelet product which are greater than the threshold to identify one or more frequency bands in the received signal.

16. A computer program product comprising at least one non-transitory computer-readable storage medium having computer-executable program code instructions stored therein, the computer-executable program code instructions comprising:

program code for calculating a normalized wavelet product of the received signal, wherein the normalized wavelet product is:

$$F_N(n)=|F(n)|/\Delta^J$$

where $$F(n) = \prod_{j=1}^{J} W_{2^j} P(n),$$

$W_{2^j}$ is the continuous wavelet transform having a scale of $2^j$ and P(n) is the power spectral density at subcarrier n of the received signal, and $\Delta$ is the mean power spectral density of the received signal calculated as follows:

$$\Delta = \frac{1}{N} \sum_{n=0}^{N-1} P(n);$$

program code for setting a threshold for local maxima of the normalized wavelet product; and program code for detecting one or more edges in the received signal based on local maxima of the normalized wavelet product which are greater than the threshold to identify one or more frequency bands in the received signal.

* * * * *